June 20, 1950 L. A. MICHELINI 2,511,865

TELEPHONE RECORDER

Filed Oct. 23, 1947 2 Sheets-Sheet 1

INVENTOR.
LEO A. MICHELINI
BY [signature]
ATTORNEY

June 20, 1950 L. A. MICHELINI 2,511,865

TELEPHONE RECORDER

Filed Oct. 23, 1947 2 Sheets-Sheet 2

INVENTOR.
LEO A. MICHELINI
BY
Arlington C. White
ATTORNEY

Patented June 20, 1950

2,511,865

UNITED STATES PATENT OFFICE 2,511,865

TELEPHONE RECORDER

Leo A. Michelini, San Francisco, Calif., assignor of one-third to Luigi Sbrana and one-third to Domenic Sciarra, both of San Francisco, Calif.

Application October 23, 1947, Serial No. 781,666

7 Claims. (Cl. 179—5.5)

Figure 1:
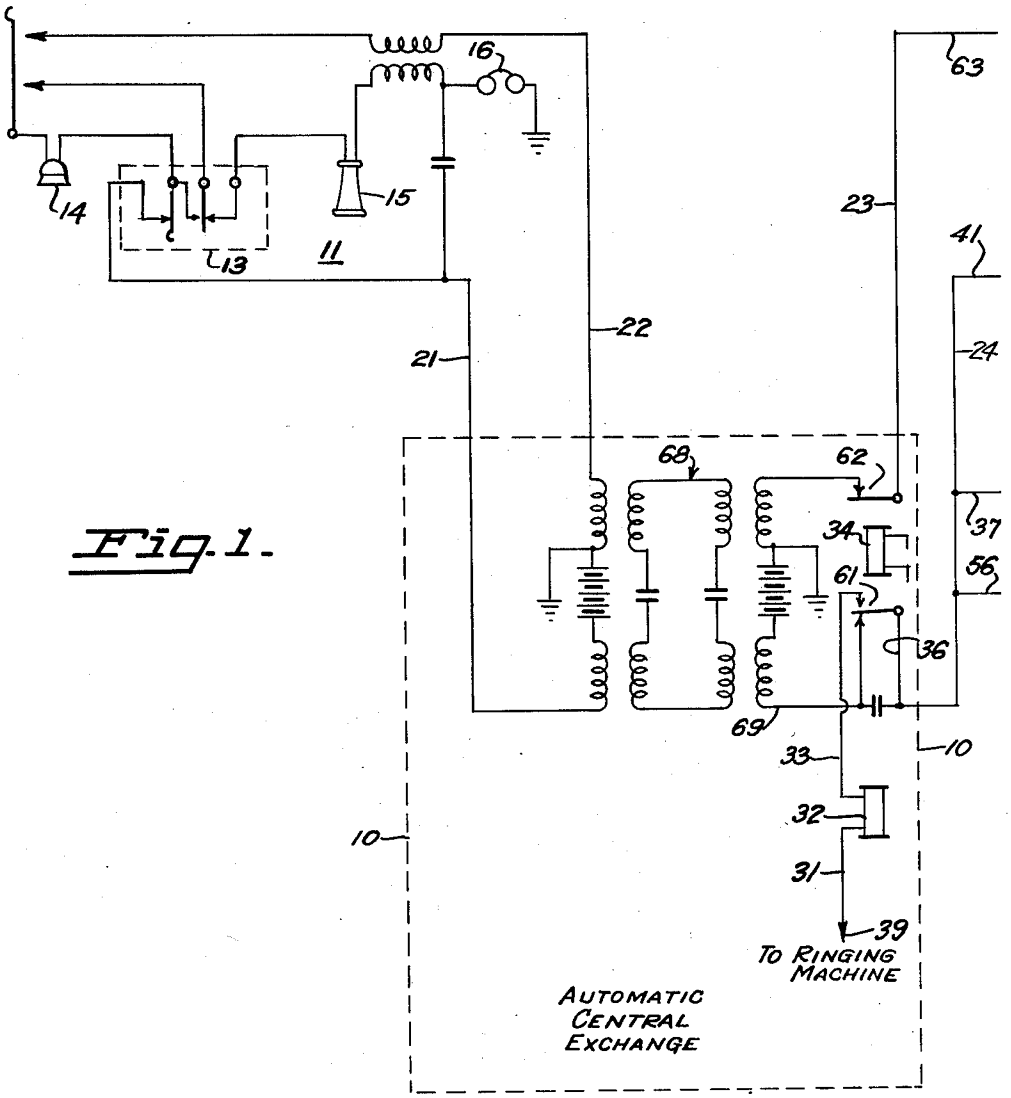

The invention, in general, relates to the message sending and recording art as applied to telephone systems, and more particularly relates to an improved system and apparatus for effecting the ready transmission and recordation of a message between a multiplicity of telephone subscribers' stations, all in a relatively simple way and with relatively simple equipment.

Heretofore, as is perhaps well known, there has been some development of apparatus and systems for enabling the recordation of telephone numbers, as well as other indicia, at a telephone subscriber's station. Most of these prior types of systems either are commercially prohibitive because of the expensive installations and appreciable changes required, while others are not practicable because of the necessity of modifying or altering of existing telephonic equipment in order to complete the adaptation. The present invention is directed to the provision of telephonic recorder apparatus and system which obviates the above mentioned disadvantages as well as inherent difficulties of such prior systems.

A primary object of my invention is to provide an improved telephone recorder for adaptation to any existing telephone system employing an automatic central exchange, without necessitating any changes whatsoever in the basic existing telephone equipment.

Another important object of the present invention is to provide an improved telephone recorder of the indicated nature which is additionally characterized by its flexibility in that it is readily adaptable to not only local but also to long distance or cross-country dial calls.

A still further object of the invention is to provide an improved telephone recorder of the aforementioned character which can be economically installed and which requires little, if any, maintenance expense.

Other objects of the invention, together with some of the advantageous features thereof, will appear from the following description of a preferred embodiment of the invention which is illustrated in the accompanying drawings. It is to be understood that I am not to be limited to the precise embodiment shown, nor to the precise arrangement of the various parts thereof, as my invention, as defined in the appended claims, can be embodied in a plurality and variety of forms.

Figure 2:
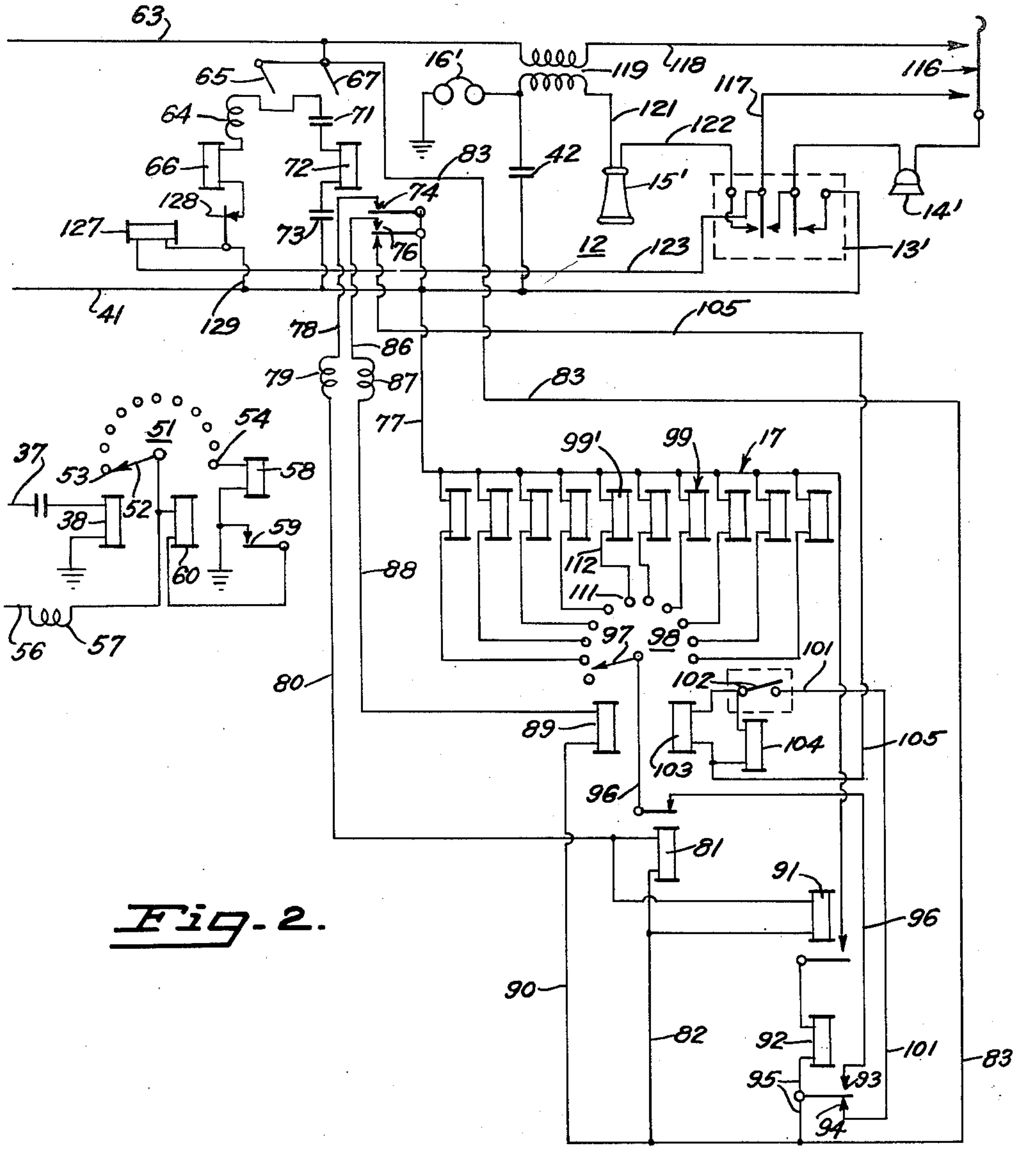

Referring to the drawings:

Figs. 1 and 2, taken together, are diagrammatic views of a preferred embodiment of the invention.

In its preferred form, the improved telephone recorder of my present invention preferably comprises means establishing an alternating current circuit and a direct current circuit, means for alternately and recurrently energizing first said alternating current circuit and then said direct current circuit, a recorder circuit; said recorder circuit being adapted to be superimposed on said direct current circuit, recorder apparatus in said recorder circuit, together with a movable recorder circuit closing contact, means for advancing said contact successively to its ultimate limit of movement to effect the ultimate closing of said recorder circuit, a relay for holding said contact at its circuit closing position for a predetermined interval of time to permit operation of said recorder apparatus, and means for applying a series of impulses on said recorder circuit to effect recordation of a dialed number on said recorder apparatus, as well as means for breaking said recorder circuit at the completion of a message, and means for interrupting and disconnecting said recorder circuit during recording operations to establish a voice circuit.

The present invention constitutes an improvement upon my previous invention on the same subject for which Letters Patent, No. 2,220,940, was granted to me on November 12, 1940.

As illustrated in the annexed drawings depicting my improved telephone recorder in diagrammatic view, it is proposed to adapt my apparatus and system to any existing telephone system employing an automatic central exchange 10, indicated in block by dotted lines in the lower right of Fig. 1. While any number of subscribers' telephones may be connected with central exchange 10, I have illustrated the invention with respect to but two subscribers' telephone stations for purposes of brevity and simplicity of explanation, such stations being designated by the reference numerals 11 and 12 in Figs. 1 and 2, respectively, of the annexed drawings. As is customary, each subscriber's telephone will be provided with standard dial mechanism 13, a transmitter 14, a receiver 15, and call bells 16. Similar reference numerals, except using the prime thereof, have been employed with respect to subscribers' telephone station 12 in Fig. 2. In addition to the equipment mentioned above, each subscriber's telephone station will be provided with a printing device 17, see Fig. 2, of the conventional type and which, per se, is not my invention but is shown in diagrammatic view as a part of the combination herein described and claimed.

Inasmuch as the present improvement does not require any changes whatsoever in the existing telephone dial systems, such as panel, cross-bar, Strowger automatic equipment, etc., etc., at the automatic central exchange, it is believed that an explanation of procedure by which a call is completed from a calling to a called telephone is not necessary. Suffice is it to state that if a party at station 11 desires to call a party at station 12, the party at station 11 merely lifts the receiver 15 from its hook, waits for the now familiar dial tone, and then proceeds to dial the telephone number of station 12 in the usual manner employing dial mechanism 13. As illustrated in the annexed drawings, the circuits established on direct party to party calls between stations 11 and 12 will be through the automatic central exchange 10 over lines 21 and 22, and from the central exchange over conductors 23 and 24 through call bells 16' of station 12, see Fig. 2. Should it occur that the subscriber at station 12 is at home and answer, the receiver 15' will be removed from its hook to establish the voice or speaking circuit through transmitter 14' of station 12, receiver 15 of station 11, transmitter 14 of station 11, and receiver 15' of station 12. Under existing types of telephone circuits and equipment, the bells 16' at station 12 would continue to ring, if no one answers at station 12, until the receiver 15 at station 11 is replaced on its hook to break the voice or speaking circuit and cause the equipment at the central exchange to re-assume its initial position. Naturally, an incompleted call would, in many instances, lose revenue for the telephone company and certainly would be an annoyance and inconvenience to a subscriber who may have to attempt to call time and again until the called party is reached.

In accordance with the present invention, means are provided for obviating the necessity for a subscriber to make repeated calls to the subscriber's station with whom he desires to speak, and these means include a recorder device at each subscriber's station for recording the numbers of the calling parties at the station of the called parties whereby the called parties are notified that one or more calls, of which the numbers are indicated, have been attempting to reach them, while absent from home. To this end, I provide several circuits of which at least two are to alternately cause alternating current and direct current to flow through the bell ringing circuit, and include in such circuits equipment for causing the bells to ring during the supply of alternating current and to remain silent during the supply of direct current. The purpose of supplying these two different currents through the ringing circuit is to permit the establishment of the voice or talking circuit in the event the party at the called station should answer either when the call bells are ringing or when they are silent at the time any call is being put through.

With reference to the drawings, the above mentioned circuits that supply alternately first alternating current and then direct current through the ringing circuit may be traced at the central exchange 10 beginning with line 31, through relay 32, conductor 33 to the normally open contact of relay 34, thence from the relay 34 contact through line 36, all in Fig. 1, through conductor 37 and relay 38 to ground, and back to the grounded side of the ringing machine, see arrow 39 in the block diagram 10 of Fig. 1 indicating the exchange. It is to be understood that the relay 13 automatically closes upon the closing of the ringing circuit. Simultaneously, the same ringing current will also flow through conductor 41, condenser 42, call bells 16' at station 12 to ground and back to the grounded side of the ringing apparatus. This last traced circuit is the circuit which causes the bells 16' to ring while the ringing machine is supplying alternating current through the ringing circuit, and to remain silent while direct current is being supplied by the ringing machine.

The arrangements of circuits just described are in combination with selector switch mechanism 51 and additional circuits for enabling, at a predetermined time, electrically to interlock the recorder device 17 into the system for the duration of a recording period. Selector switch 51 includes a movable arm 52 which is caused to advance, on each ringing of call bells 16', step by step from a base or home position 53 to an ultimate or relay closing position 54, see Fig. 2. The selector switch arm 52 is caused to advance step by step by the energization of the relay 38 until the arm reaches station or position 54 and when this occurs, on the next flow of direct current from the ringing machine, the current will flow through conductor 56, choke coil 57, through selector switch mechanism 51 and relay 58 to ground, and back to the grounded side of the ringing machine. The energization of relay 58 will effect the closing of switch 59 and, almost simultaneously, the energization of release relay 60 thereby causing the switch selector arm 52 to return to its home or initial position 51.

It is to be especially observed that due to the high impedance of call bells 16', the values of the alternating and direct current supplied by the ringing machine are relatively low so that relay 32 remains inoperative. However, upon the establishment of the circuit containing relay 58, and since such relay has a low impedance, currents of relatively high value will flow through relay 32 thus energizing the same and effect the operation of its contacts, not shown, which in turn will cause relay 34 to become de-energized as is well known to those skilled in the art of automatic telephony. It also is to be observed that upon the energization of relay 58, both switches 59 and 65 are closed, and that upon de-energization of relay 34 of the contacts 61 and 62 in the central exchange circuit will be closed, thereby impressing the central exchange battery voltage across conductors 23 and 24, the former being connected to line 63 and the latter to conductor 41. Hence, when the switch 65 closes due to the action of relay 58, as above mentioned, the current supplied by the central battery will flow through line 23, line 63, switch 65, a choke coil 64, a relay 66, conductor 41 and conductor 24, line 36 and contact 61 back to the negative terminal of the central battery. Upon energization of relay 66, it in turn effects the closing of switch 67 thereby electrically interlocking the printing device 17 into the system. During the period that the bells 16' are being rung at station 12, part of the ringing current is also being transmitted to station 11 in the usual manner. With the cessation of the ringing at station 12, the party at station 11 is informed that the recorder device is awaiting operation.

In accordance with the present invention, means are provided in connection with the interlocked recorder for superimposing a pulsating direct current voltage across lines 41 and 63 on the existing direct current already being supplied by the central exchange battery. The pulsating direct current is derived from the subscriber's dialing mechanism 13 at station 11 through the central exchange by the dialing of such subscriber's own telephone number, the series of impulses being inductively transmitted across a set of repeating coils 68 provided at the central exchange 10. The pulsating current induced will flow from point 69 of the repeated coils through contact 62, conductors 23 and 63, switch 67, see Fig. 2, which had previously been closed as above stated, through a condenser 71, a pulse-receiving relay 72, a condenser 73, and conductors 41 and 24 back to the point 69 of the repeating coils 68. The establishment of this circuit will cause relay 72 to energize and de-energize in accordance with the impulses dialed by the subscriber at station 11. An additional circuit for the printing device includes the contacts 74, 76 of the relay 72, a line 77 from one terminal of the printing device 17 to the upper contact 74 of relay 72, a conductor 78 from the contact 74 through a choke coil 79, a line 80 from choke coil 79 to a relay 81, together with a line 82 from relay 81 to a conductor 83 back to line 63. Also, a recorder circuit is provided from lower contact 76 of relay 72 through a line 86, a choke coil 87, a line 88 from choke coil 87 to a relay 89, thence through a line 90 to conductor 83 and back to line 63.

In addition to the above circuits, I provide a circuit containing a relay 91, which is in parallel with relay 81 and which, when energized so that its normally open contact 93 closes, conditions a circuit including a relay 92 and containing the conductor 77, upper and lower contacts 93 and 94 respectively, of relay 92, a line 95 from the relay 92, and the conductors 83 and 63. Upper contact 93 of relay 92, when closed, effects the establishment of a circuit containing a line 96 leading from relay 92 to a switch contact arm 97 of a selector switch 98 of the recorder device 17, which latter includes a bank of magnets 99. Lower contact 94 of relay 92, when closed, establishes a circuit containing a line 101 from such contact to a switch 102, thence to a relay 103, a relay 104 in parallel with relay 103, and a conductor 105 leading to the contacts of relay 72. It may be stated here that energization of magnets 99 will effect the actuation of a pivoted type arm, not shown, over which is automatically fed an ink ribbon and paper tape, also not shown, in accordance with conventional recorder mechanisms. Moreover, the energization of relay 103 will effect the release of switch arm 97 of the selector switch 98 from its most advanced position and allow the arm to return to its initial or base position and, at the same time, relay 104 will advance the inked ribbon and paper tape of the recorder mechanism one step to condition the printing device for the reception of another digit and series of digits.

In explanation of the recording process, let it be assumed that the subscriber at station 11 has commenced the dialing of his number and has initially dialed the digit 5. By virtue of the circuits above described, as relay 72 becomes energized and its contacts 74 and 76 close, direct current furnished by the central exchange battery will flow from line 77, see Fig. 2, upper contact 74 of relay 72, through line 78, choke coil 79, and line 80 to relay 81 and thence from relay 81 over line 82 and line 83 to conductors 63 and 23 back to the exchange. At the same time, some current will also flow from lower contact 76 of relay 72 through line 86, choke coil 87 and conductor 88 to relay 89, and from the relay 89 over lines 90 and 83 back through lines 63 and 23 to the exchange. Upon energization of relay 81, its contact will open and, since relay 81 is of the sluggish type and will not release immediately, its contact will remain open until the last impuse of a dialed series of impulses is made. Relay 91, being in parallel with relay 81, will become energized at the same time as relay 81 causing the relay 91 to close its normally open contact thereby completing a circuit for relay 92 and traceable as follows: line 77 to the contact of relay 91 through relay 92 and lines 95, 83 and 63. Relay 91 is of the same type as relay 81, i. e., sluggish on release and will, therefore, remain energized until the last of a series of impulses has been sent. With relay 92 energized its upper contact 93 will become closed to complete the circuit to switch arm 97 as above stated. Since it already has been assumed that the digit 5 has been dialed, then relay 72 receives five impulses to open and close its contacts five times and, by so doing, causing relay 89, which influences selector switch arm 97, to energize and de-energize five times thus causing switch arm 97 to advance five notches or steps to say the position 111 which is connected to a line 112 leading to one of the magnets 99′ of the bank of magnets 99. A split second after the fifth and last impulse has been sent, relay 81 will deenergize to close its contact so that a current will flow from line 41 through line 77, magnet 99′, line 112, switch arm 97, conductor 96, through upper contact 93 of relay 92, to wires 95, 83 and 63 back through line 23 to the central exchange battery. Upon energization of the magnet 99′, a pivot type arm, carrying the numeral 5, will be actuated and strike a platen over which the inked ribbon is fed to record the digit 5 on the tape, as above indicated.

Before proceeding to the remaining digits of the subscriber's telephone number at station 11, it may be observed that contact switch 102 is normally open and remains open as long as selector switch arm 97 of switch 98 is in the base or initial position. As soon as switch arm 97 moves away from its base position, however, the switch or contact 102 closes. It also is to be noted that relay 91 is slightly more sluggish in its operation than relay 81 so that its contact remains closed sufficiently long to allow the printing process of the recorder device to take place. Upon de-energization of relay 91, its contact opens causing relay 92 to de-energize whereby the contacts 93 and 94 resume their initial or original positions as indicated in Fig. 2 of the drawings. When this occurs, the circuit containing relays 103 and 104 is established from contact 94 of relay 92 through line 101, and effects the return of the switch arm 97 of the selector switch 98 to its base or initial position.

The succeeding dialing operations by the subscriber at station 11 will cause the selector switch arm 97 of the selector switch 98 to assume different advanced positions with respect to its base or initial position causing energization of first one and then another of the magnets of the bank of magnets 99. Or, in other words, the repitition of the steps and energization of the circuits and relays as above described in connection with the dialing of the digit 5. When the last digit has been dialed, the subscriber at station 11 merely returns the receiver 15 to its hook causing the operation of the standard relays, switches etc., etc. of the automatic telephone exchanges, and thereby removing the central batteries from the telephone involved, namely, at station 11 and 12.

The removal of current supply from station 12 causes the de-energization of relay 66 which, in turn, opens switch contacts 67 to completely remove the recorder unit 17 from the system. The usual relays, switches, etc., etc., of the conventional automatic telephone exchange, mentioned above, have been omitted from the drawings, since such equipment is familiar to those skilled in the art of telephony.

Turning to the possible contingency that the subscriber at station 12 might answer the telephone while the recording device is in operation and before the completion thereof. In such event, the printing device will automatically be disconnected from the system and the voice circuit established, due to the provision of an auxiliary circuit which includes the hook switch 116 of receiver 15' at station 12, see Fig. 2, a line 117 from the dial mechanism 13' at station 12, a line 118 from switch 116 to an induction coil 119, a line 121 from the induction coil to receiver 15', a short line from the receiver 15' to the dial mechanism 13', a conductor 123 from the dial mechanism to a relay 127, relay contact 128, and a line 129 from contact 128 to conductor 41 which leads to the central battery over line 24. The energization of relay 127 will open contact 128 thereof thereby opening the circuit for relay 66 which, in turn, will open contact 67 to disconnect the printing device 17 from the system. This energization of the relay 127 is effected when the receiver hook switch 116 is closed by picking up receiver 15'. It is to be noted that relay 127 also functions as an auxiliary release device for the switch arm 97 of selector switch 98 in the event that the switch arm 97 is at some position other than its base position at the time the party at station 12 answers the phone and interrupts the recorder mechanism, and acts to return the switch arm 97 to its base position.

The above described system, it is clear, is applicable to a multiplicity of subscribers' telephone stations by the installation of the printing device 17 at each station, together with the circuits described which do not interfere with normal circuits of existing automatic telephone exchanges, employing dial phones.

It is to be understood that the appended claims are to be accorded a range of equivalents commensurate in scope with the advance made over the prior art.

I claim:

1. A telephone recorder for recording a plurality of dialed telephone numbers, said recorder comprising, in combination with an automatic dial telephone system, an alternating current circuit, a direct current circuit, a talking circuit, means for alternately and recurrently energizing said first named circuits to effect ringing of call bells in said circuits and to cause said bells to remain silent, a printing device, a printer electrical circuit containing said device, means electrically interlocking said printer circuit into said alternating current, direct current and talking circuits, a movable arm in said printer device, means whereby said arm may be advanced in successive steps until a printer closing position is reached, and means for impressing impulses on said first named circuits and for supplying a pulsating direct current in said talking circuit while interlocked with said printer circuit and during predetermined time intervals after the printer circuit is closed to actuate said recorder device and to effect printing of a dialed telephone number.

2. A telephone recorder for recording a plurality of dialed telephone numbers, said recorder comprising, in combination with an automatic dial telephone system, an electrical circuit, call bells in said circuit, means for setting up alternately and recurrently an alternating current and a direct current flow in said electrical circuit to cut means in and cut means out said bells, a printing device, a printer electrical circuit containing said device, a selector switch in said device and electrically connected into said printer circuit, means for interlocking said electrical circuits at a predetermined moment, a movable selector arm connected to said selector switch; means whereby said movable arm may be moved step by step in response to impulses impressed on said circuits, and means for applying a series of impulses to said circuits corresponding to a telephone subscriber's telephone number who desires to be called by the party dialed thus effecting the printing of such number in said printing device.

3. A telephone recorder as defined in claim 1, and including means for interrupting and disconnecting said printer circuit from the system during operation of said printer device.

4. A telephone recorder as defined in claim 2, and including means in said printer circuit for returning said movable selector switch arm to its initial position upon the completion of the printing of each dialed number and digit thereof.

5. A telephone recorder as defined in claim 2, and including means in said circuits for returning said movable selector arm to its initial position whenever the printer electrical circuit is disconnected.

6. In a telephone recorder for recording a plurality of dialed telephone numbers, an electrical circuit, a printer electrical circuit, a printer device, a selector switch in said printer device electrically connected into said printer circuit, means for interlocking said electrical circuit and said printer circuit at a predetermined moment, a movable selector arm connected to said selector switch, and means whereby said arm may be moved step by step in response to impulses impressed on said circuits until a printer closing position is reached.

7. In a telephone recorder for recording a plurality of dialed telephone numbers, an alternating current circuit, a direct current circuit, a talking circuit, a printer device, a printer electrical circuit containing said printer device, a movable arm in said printer device, means whereby said arm may be moved in successive steps until a printer closing position is reached, and means for impressing impulses on said first named circuits, and for supplying a pulsating direct current in said talking circuit during predetermined time intervals after the printer circuit is closed to actuate said printer device, and to effect recordation of a dialed telephone number.

LEO A. MICHELINI.

REFERENCES CITED

The following references are of record in the file of this patent:

UNITED STATES PATENTS

| Number | Name | Date |
|---|---|---|
| 1,337,310 | Goodrum | Apr. 20, 1920 |
| 1,577,869 | Podolsky | Mar. 23, 1926 |
| 1,810,865 | Warwick | June 16, 1931 |
| 1,887,588 | Elkins | Nov. 15, 1932 |
| 1,952,280 | Parker | Mar. 27, 1934 |
| 2,220,940 | Michelini | Nov. 12, 1940 |